(12) United States Patent
Slavov et al.

(10) Patent No.: US 9,415,940 B2
(45) Date of Patent: Aug. 16, 2016

(54) TAKE-UP DEVICE

(71) Applicant: THYSSENKRUPP ROBINS, INC., Greenwood Village, CO (US)

(72) Inventors: Svetoslav Slavov, Littleton, CO (US); Vladimir Svirsky, Aurora, CO (US); Martin S. Lurie, Englewood, CO (US)

(73) Assignee: THYSSENKRUPP INDUSTRIAL SOLUTIONS (USA), INC., Greenwood Village, CO (US)

( * ) Notice: Subject to any disclaimer, the term of this patent is extended or adjusted under 35 U.S.C. 154(b) by 0 days.

(21) Appl. No.: 14/422,090

(22) PCT Filed: Aug. 16, 2013

(86) PCT No.: PCT/US2013/055468
§ 371 (c)(1),
(2) Date: Feb. 17, 2015

(87) PCT Pub. No.: WO2014/028906
PCT Pub. Date: Feb. 20, 2014

(65) Prior Publication Data
US 2015/0217944 A1 Aug. 6, 2015

Related U.S. Application Data

(60) Provisional application No. 61/684,042, filed on Aug. 16, 2012.

(51) Int. Cl.
*B65G 23/44* (2006.01)
(52) U.S. Cl.
CPC ...................................... *B65G 23/44* (2013.01)
(58) Field of Classification Search
CPC ....................................................... B65G 23/44
USPC ............................................................ 198/815
See application file for complete search history.

(56) References Cited

U.S. PATENT DOCUMENTS

| | | | |
|---|---|---|---|
| 2,371,747 A * | 3/1945 | Faris | B65G 17/063 198/815 |
| 3,054,499 A | 9/1962 | Petix et al. | |
| 3,314,554 A | 4/1967 | Cuniberti | |
| 3,529,710 A | 9/1970 | Fiegel, Jr. | |
| 3,536,185 A * | 10/1970 | Beck | B66B 23/18 198/815 |
| 3,877,595 A | 4/1975 | Edelman | |
| 4,033,451 A | 7/1977 | Kelsall | |
| 4,337,959 A | 7/1982 | Bettin et al. | |
| 5,029,740 A | 7/1991 | Cox | |
| 6,220,425 B1 | 4/2001 | Knapp | |

(Continued)

*Primary Examiner* — James R Bidwell
(74) *Attorney, Agent, or Firm* — Dorsey & Whitney LLP

(57) ABSTRACT

A conveyor take-up device may include a carriage, a pulley, a counterweight assembly, at least one connector, and at least one safety restraint. The carriage may be movably joined to a support structure and may support the pulley, which may be configured for operative association with an endless conveyor belt. The counterweight assembly may include a counterweight arm, a tension arm, and a counterweight. The counterweight arm may be pivotally joined to the support structure and configured to move between upper and lower limit positions. The tension arm may extend generally transversely from a first end portion of the counterweight arm with the counterweight supported by the counterweight arm distal from the tension arm. The connector may be joined to the carriage at one end portion of connector and to the tension arm at a second end portion that is distal the first end portion of the connector.

26 Claims, 10 Drawing Sheets

(56) References Cited

U.S. PATENT DOCUMENTS

| | | |
|---|---|---|
| 6,394,261 B1 | 5/2002 | DeGennaro |
| 7,585,259 B2 | 9/2009 | Turner |
| 7,837,021 B2 * | 11/2010 | Ichikawa ............... B66B 23/18 198/815 |
| 2009/0101475 A1 | 4/2009 | Nguyen et al. |
| 2012/0055759 A1 | 3/2012 | Horst |

* cited by examiner

TAKE-UP DEVICE

CROSS-REFERENCE TO RELATED APPLICATIONS

This application claims the benefit, under 35 U.S.C. §119(e), to U.S. provisional application No. 61/684,042, entitled "Take-Up Device" and filed on Aug. 16, 2012, which is hereby incorporated herein by reference in its entirety.

TECHNOLOGICAL FIELD

The technological field generally relates to conveyors, and more particularly to endless belt conveyors.

BACKGROUND

Tensioning devices for endless belt conveyors are used to maintain the required tension in the endless belt as the endless belt accrues permanent stretch, particularly during the initial running period for a newly installed endless belt. For relatively short conveyors, such as those sometimes used to carry away a discharge feed from a mineral crusher, the amount of linear travel required from the tensioning device is typically on the order of several inches up to one or two feet. Conventional tensioning devices include screw take-ups, hydraulic take-ups, and tensioned rope-and-sheave system take-ups that bias a tail pulley by weights positioned within a vertical tower. Disadvantages of these various conventional take-up systems may include the need for frequent manual adjustments, significant maintenance requirements, substantial costs, or interference with clean-up or maintenance work that must often be conducted in the vicinity of the tail of the conveyor.

SUMMARY

One embodiment of a take-up device for a conveyor may include a carriage, a pulley, a counterweight assembly, a connector, and a safety restraint. The carriage may be movably joined to a support structure. The pulley may be joined to the carriage and configured for operative association with an endless belt of the conveyor. The counterweight assembly may include a counterweight arm, a tension arm, and a counterweight. The counterweight arm may be pivotally joined to the support structure and configured to move from an upper limit position to a lower limit position. The tension arm may extend generally transversely from a first end portion of the counterweight arm. The counterweight may be supported by the counterweight arm at a second end portion of the counterweight arm where the second end portion of the counterweight arm is distal from the first end portion of the counterweight arm. The connector may be joined to the carriage at one end portion of the connector and to the tension arm at a second end portion of the connector that is distal the first end portion of the connector. The safety restraint may be joined to the counterweight arm and configured to resist movement of the counterweight arm below the lower limit position.

In some embodiments of the take-up device, a ratio of a length of the counterweight arm to a length of the tension arm may range from no less than approximately 1:1 to no greater than approximately 10:1, and the ratio may be approximately 5:1.

In some embodiments of the take-up device, the upper limit position of the counterweight arm may be approximately 30 degrees above horizontal, and the lower limit position may be approximately 15 degrees below horizontal.

In some embodiments of the take-up device, a connector adjustment mechanism may be joined to the carriage, and the connector may be joined to the carriage via the connector adjustment mechanism. The connector adjustment mechanism may be a turnbuckle or the like.

In some embodiments of the take-up device, the counterweight assembly may further include a second counterweight arm and a second tension arm. The second counterweight arm may be pivotally joined to the support structure and configured to move from the upper limit position to the lower limit position. The second tension arm may extend generally transversely from a first end portion of the second counterweight arm. The counterweight may also be supported by the second counterweight arm at a second end portion of the second counterweight arm where the second end portion of the second counterweight arm is distal from the first end portion of the second counterweight arm. A second connector may be joined to the carriage at one end portion of the second connector and to the second tension arm at a second end portion of the second connector that is distal the first end portion of the second connector.

In some embodiments of the take-up device, the connector may be a tension chain or cable.

In some embodiments of the take-up device, the safety restraint comprises a chain or a cable.

In some embodiments of the take-up device, the carriage, the counterweight assembly, and the connector may be configured to substantially move the pulley in a direction that is substantially parallel to a longitudinal direction of travel of the endless belt.

Another embodiment of a take-up device for a conveyor may include a carriage, a pulley, a counterweight assembly, and a hydraulic cylinder assembly. The carriage may be movably joined to a support structure. The pulley may be joined to the carriage. The pulley may be configured for operative association with an endless belt of the conveyor. The counterweight assembly may include a counterweight arm, a tension arm, and a counterweight. The counterweight arm may be pivotally joined to the support structure. The tension arm may extend generally transversely from a first end portion of the counterweight arm. The counterweight may be supported by the counterweight arm at a second end portion of the counterweight arm where the second end portion of the counterweight arm is distal from the first end portion of the counterweight arm. The hydraulic cylinder assembly may be joined to the carriage and to the tension arm and configured to transfer forces between the carriage and the tension arm.

In some embodiments, the hydraulic cylinder assembly may include a hydraulic cylinder joined to the carriage. The hydraulic cylinder assembly may further include a hydraulic piston joined to the tension arm and movably joined to the hydraulic cylinder. The hydraulic piston may include a piston head joined to a piston rod.

In some embodiments, the take-up device may further include a second hydraulic cylinder assembly joined in series to the hydraulic cylinder assembly, with the hydraulic assembly joined directly to the carriage and the second hydraulic assembly, and the second hydraulic assembly joined directly to the carriage.

Yet another embodiment of a take-up device for a conveyor may include a carriage, a pulley, a counterweight assembly, and a hydraulic cylinder assembly. The carriage may be movably joined to a support structure. The pulley may be joined to the carriage. The pulley may be configured for operative association with an endless belt of the conveyor. The counterweight assembly may include at least one counterweight arm joined to a hydraulic ram. The hydraulic cylinder assembly may be joined to the carriage and to a support. The hydraulic cylinder assembly may be in fluid communication with the hydraulic ram. The hydraulic cylinder may be configured to transfer forces between the carriage and the counterweight assembly.

In some embodiments, the hydraulic cylinder assembly may include at least two hydraulic cylinders joined in series with at least one of said two hydraulic cylinders joined to the support, and at least one other of said two hydraulic cylinders joined to the carriage.

In some embodiments, the counterweight assembly may include two counterweight arms and two hydraulic rams, with each counterweight arm joined to as least one of said two hydraulic rams. In some of these embodiments, each of said two hydraulic rams is in fluid communication with one of said at least two hydraulic cylinders, and at least two of said hydraulic cylinders are in fluid communication with each other. In other of these embodiments, in each of said two hydraulic rams is in fluid communication with a different one of said at least two hydraulic cylinders. In some of these embodiments, the take-up device may include a reservoir in fluid communication with at least one of said at least two hydraulic cylinders.

In some embodiments, the take-up device may further include at least one link positioned between the hydraulic cylinder assembly and the carriage. The at least one link may be joined to the hydraulic cylinder assembly and to the carriage.

Still another embodiment of a take-up device for a conveyor may include a carriage, a pulley, a winch system, a cart, and a hydraulic cylinder assembly. The carriage may be movably joined to a support structure. The pulley may be joined to the carriage. The pulley may be configured for operative association with an endless belt of the conveyor. The winch system may be joined to the carriage. The cart may be joined to the winch system via a flexible member. The hydraulic cylinder assembly may be joined to a support and the cart.

In some embodiments, the flexible member may be a rope.

DETAILED DESCRIPTION

Described herein are take-up devices for an endless belt conveyor. These take-up devices may provide a relatively low cost system for automatic tensioning of an endless belt for conveyors that require less than several inches of dynamic take-up travel in the course of start-up operation, shut down, and due to thermal elongation/contraction effects. These take-up devices may provide a highly visible indication for when the devices require a manual re-setting of the automatic tensioning range of the devices. The take-up devices may allow for relatively unobstructed access by vehicles used to clean-up spillage in the vicinity of the take-up device by occupying a limited volumetric space and/or by allowing for ample headroom and unimpeded floor space underneath a tail of the endless belt conveyor. The take-up devices may include counterweights with relatively low masses as a result of the counterweights acting through a mechanical advantage. The take-up devices may have relatively low capital costs and/or minimal maintenance requirements.

Figure 1:
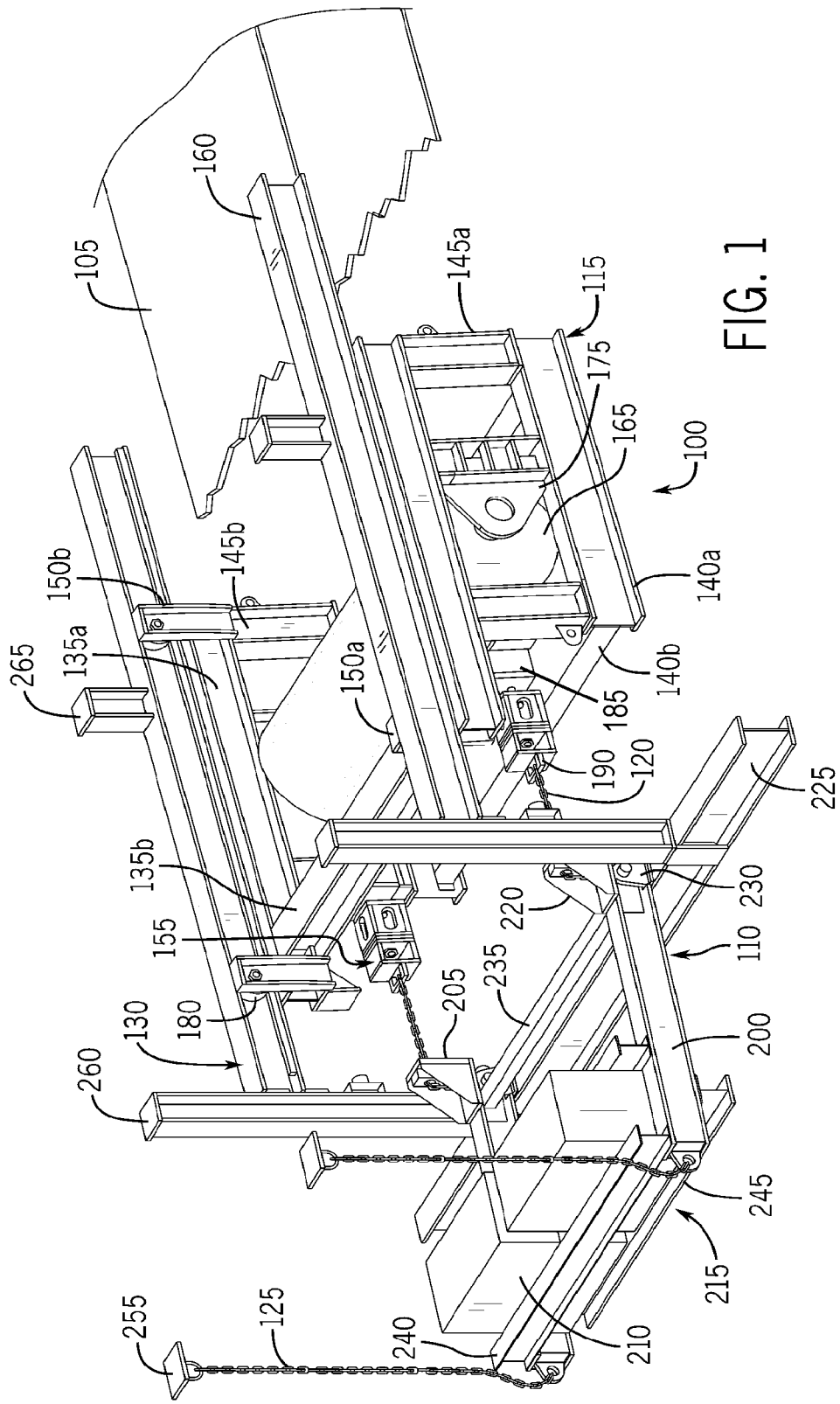
FIG. 1 shows a top isometric top view of a take-up device for a conveyor belt.
Figure 2:
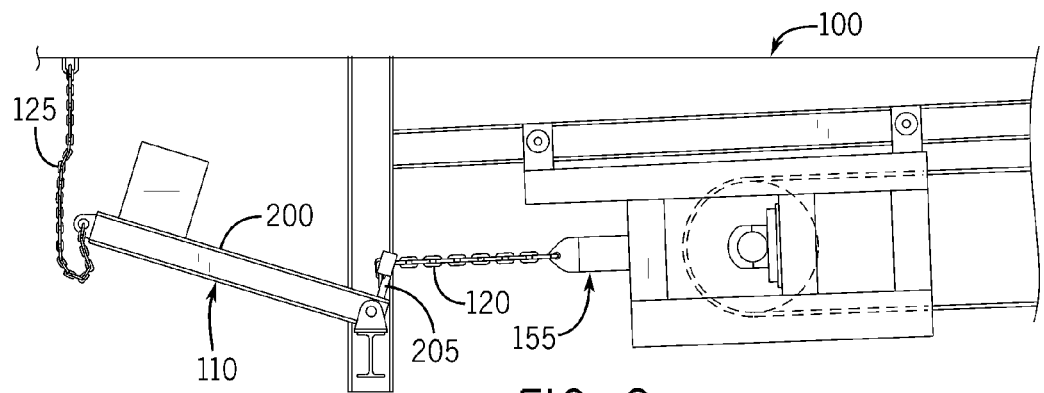
FIG. 2 shows a schematic elevation view of the take-up device shown in FIG. 1, showing a counterweight assembly in an upper limit position.
Figure 3:
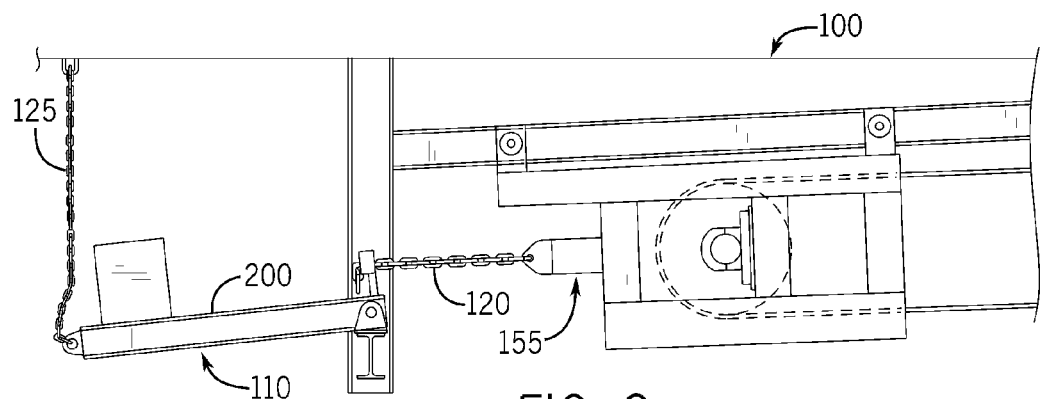
FIG. 3 shows another schematic elevation view of the take-up device shown in FIG. 1, showing a counterweight assembly in a lower limit position.
Figure 4:
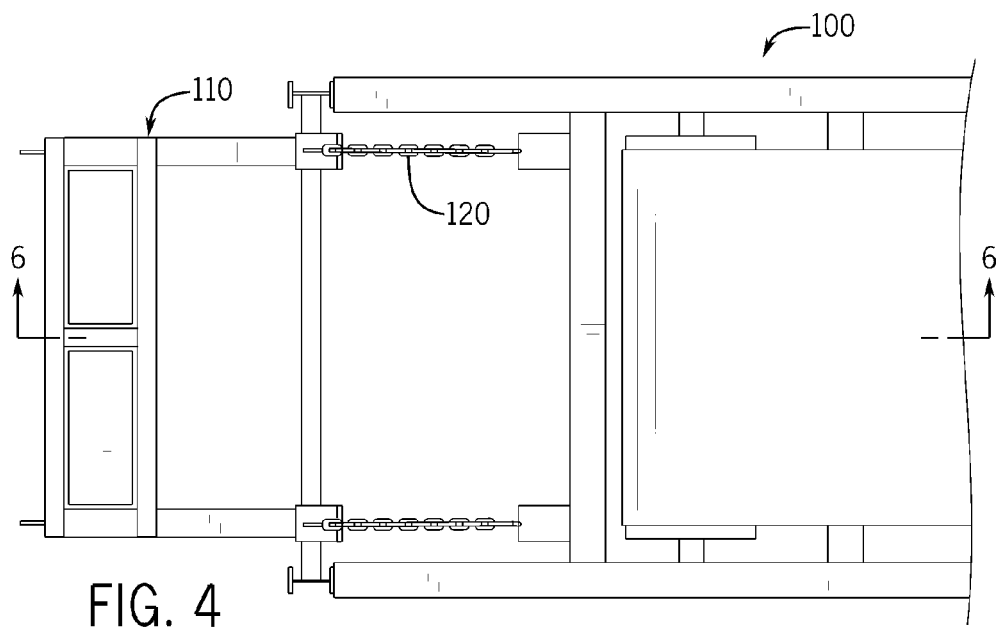
FIG. 4 shows a schematic top plan view of the take-up device shown in FIG. 1.
Figure 5:
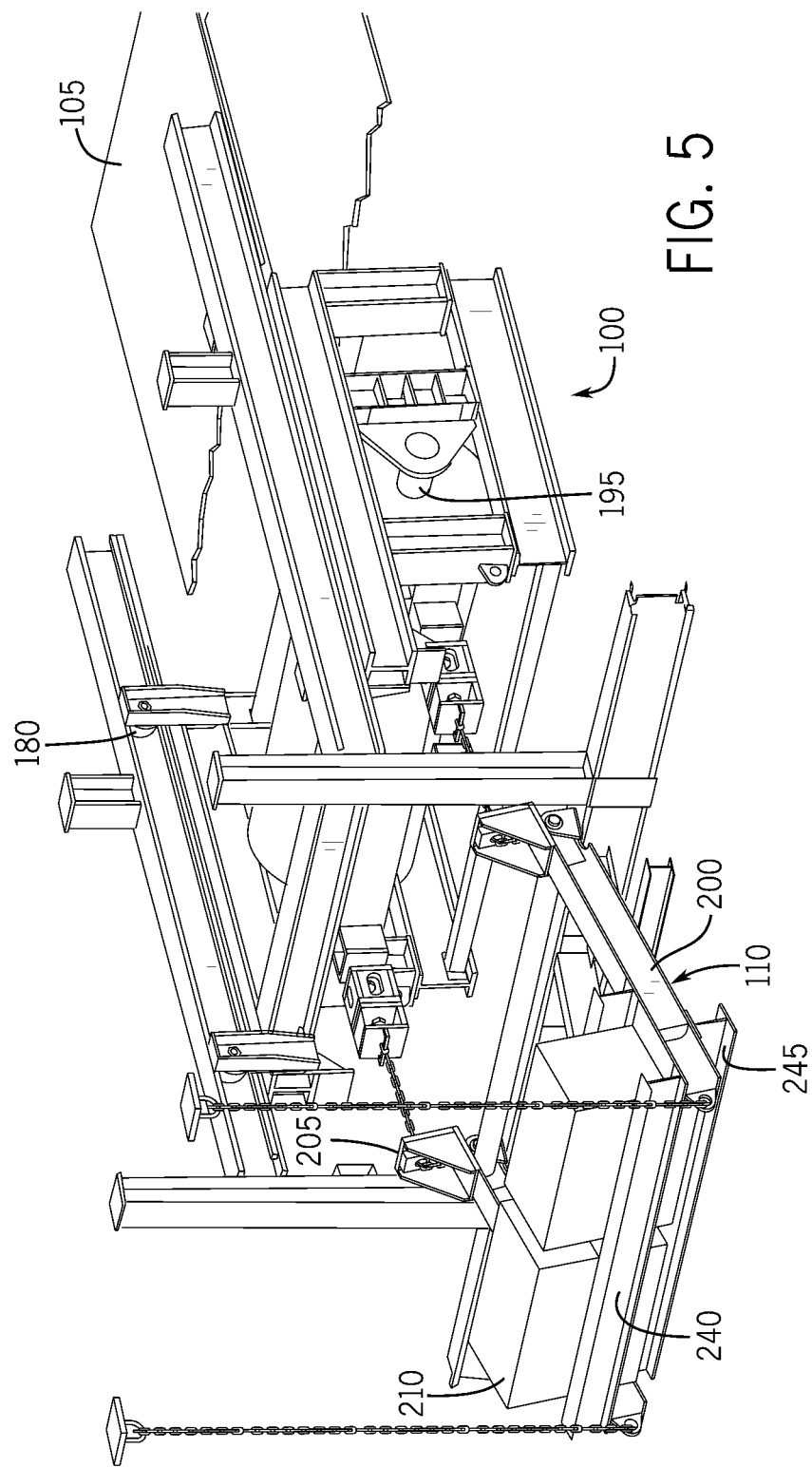
FIG. 5 shows an isometric top view of the take-up device shown in FIG. 1, showing the counterweight assembly in the lower limit position.
Figure 6:
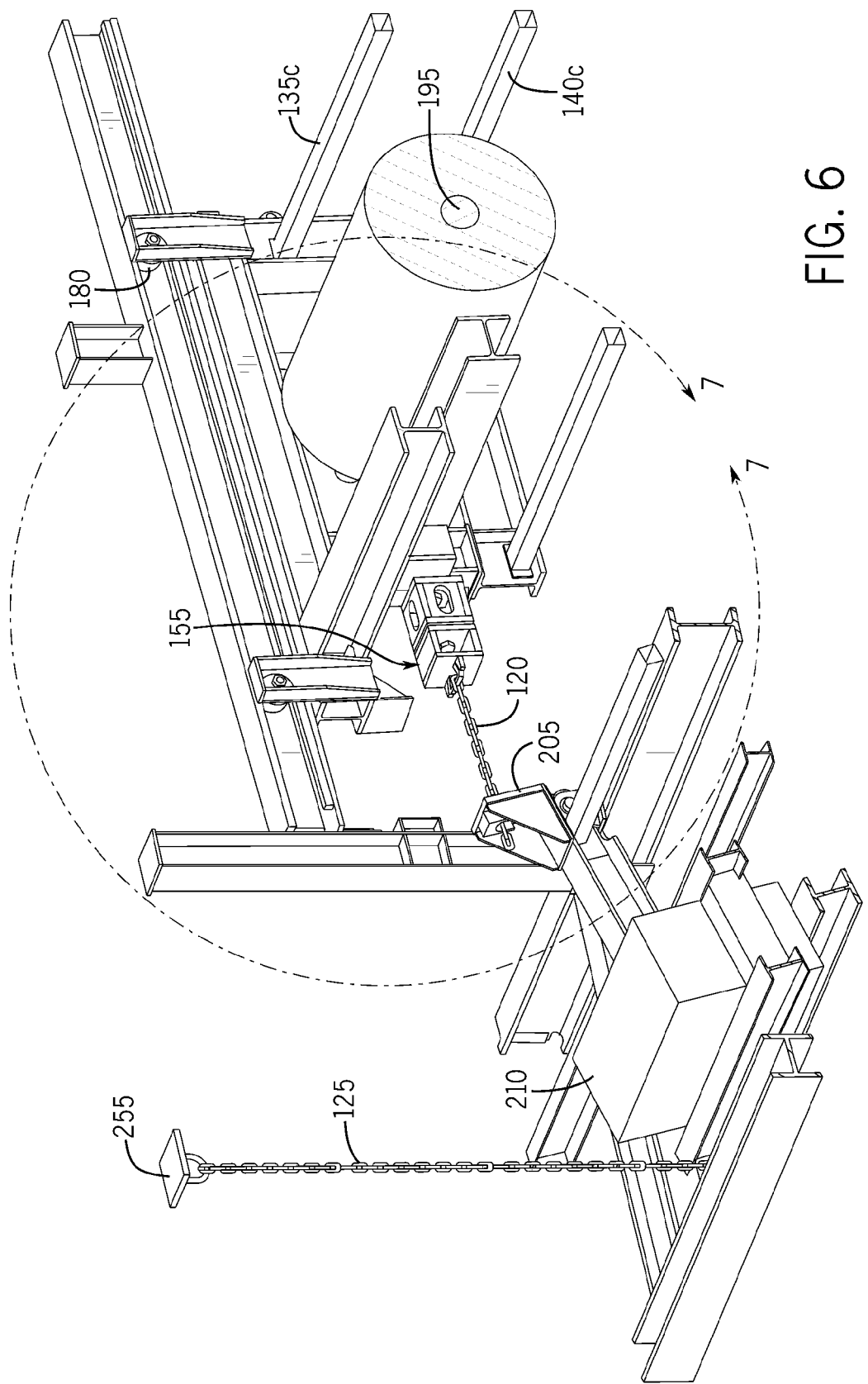
FIG. 6 shows an isometric top cross-section view of the take-up device shown in FIG. 1, viewed along line 6-6 in FIG. 1.
Figure 7:
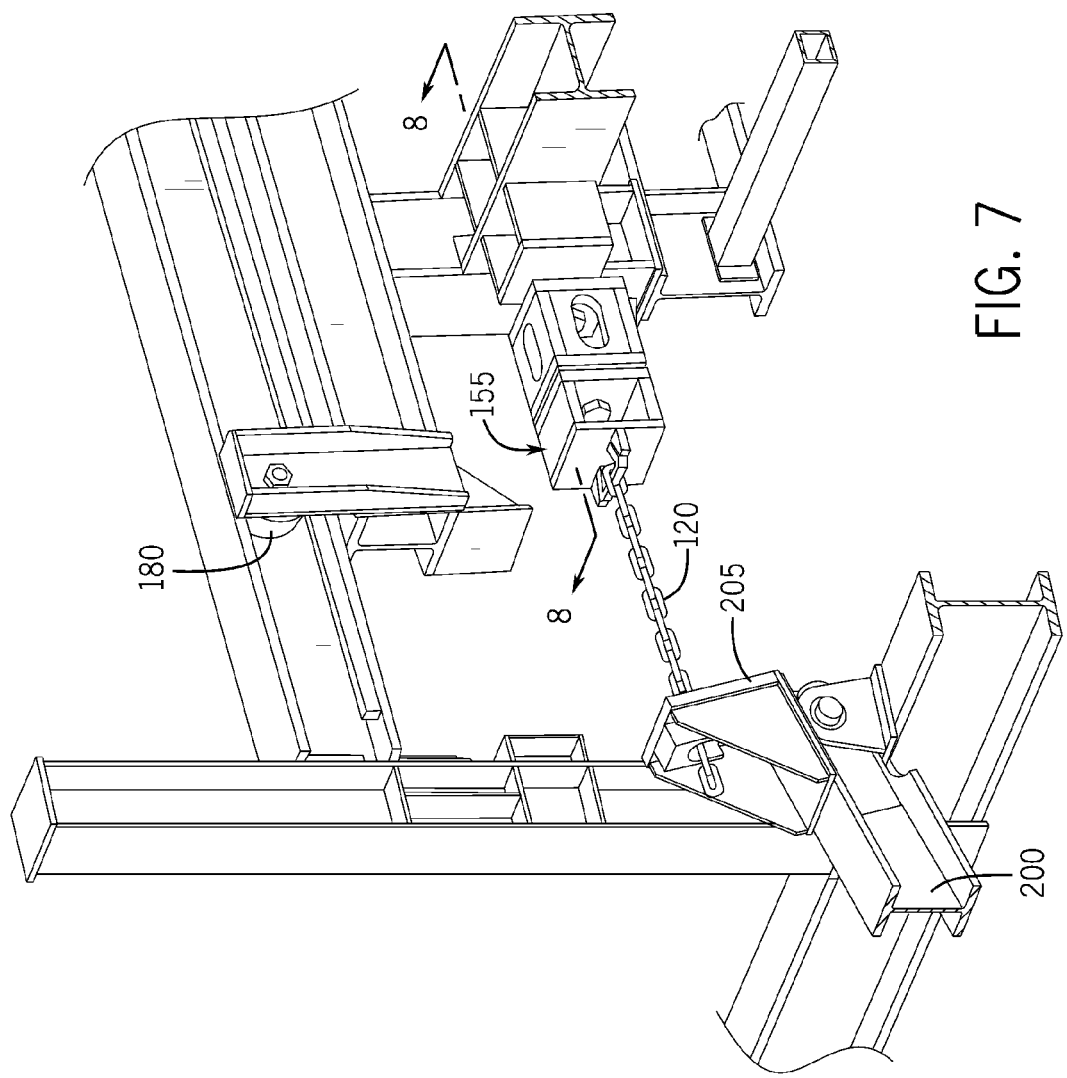
FIG. 7 shows an isometric top enlarged cross-section view of a portion of the take-up device shown in FIG. 1, viewed along line 7-7 in FIG. 6.
Figure 8:
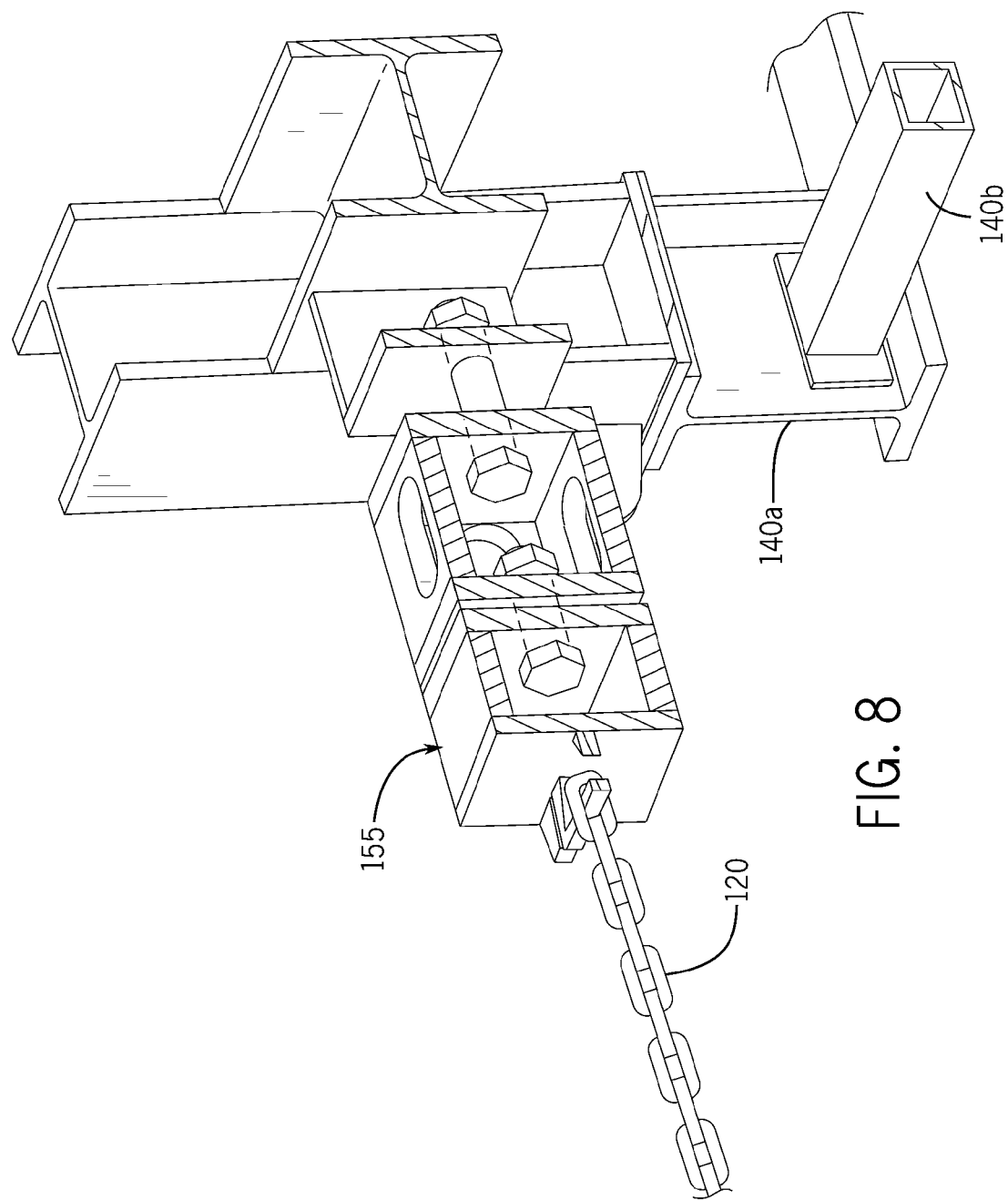
FIG. 8 shows an isometric top enlarge cross-section view of a portion of the take-up device shown in FIG. 1, viewed, for the most part, along line 8-8 in FIG. 7.

FIG. 1 shows an isometric top view of a take-up device 100 for an endless belt conveyor 105, and FIGS. 2-3 show schematic elevation views of the take-up device 100 of FIG. 1. FIG. 4 shows a top plan of the take-up device 100 of FIG. 1. FIG. 5 shows an isometric top view of the take-up device 100 of FIG. 1, showing a counterweight assembly 110 in a low limit position. FIGS. 6-8 show various isometric top cross-sectional views of the take-up device 100 of FIG. 1. With reference to FIGS. 1-8, the take-up device 100 may include a carriage 115, the counterweight assembly 110, one or more connectors 120, and one or more safety restraints 125. The carriage 115 and the counterweight assembly 110 may each be supported by a support frame 130. Further, the carriage 115 and the counterweight assembly 110 may each be movingly joined to the support frame 130, which may be supported by a frame for the conveyor (not shown). In some embodiments, the carriage 115 may slide relative to the support frame 130, and the counterweight assembly 110 may pivot or rotate relative to the support frame 130. In such embodiments, the counterweight assembly 110 may further be configured to pivot between a pre-defined upper limit position and a pre-defined lower limit position. The one or more connectors 120 may join the carriage 115 to the counterweight assembly 110. Further, the counterweight assembly 110 may apply a force to the carriage 115, via the one or more connectors 120, that tensions the endless belt 105 of the conveyor. The one or more safety restraints 125 may be joined to the conveyor frame or other fixed support element and the counterweight assembly 110. The one or more safety restraints 125 may resist movement to the counterweight assembly 110 below the lower limit position.

The carriage 115 may include upper carriage beams 135a-c, lower carriage beams 140, carriage columns 145, carriage posts 150, one or more connector adjustment mechanisms 155, and an adjustment mechanism beam 185. The upper carriage beams 135*a-c* may include a pair of first upper carriage beams 135*a*, a second upper carriage beam 135*b*, and a third upper carriage beam 135*c*, and the lower carriage beams 140*a-b* may include a pair of first lower carriage beams 140*a* and a pair of second lower carriage beams 140*b*. The carriage columns 145*a-b* may include a first set of carriage columns 145*a* and a second set of carriage columns 145*b*. The carriage posts 150 may include a first set of carriage posts 150*a* and a second set of carriage posts 150*b*.

Each first upper carriage beam 135*a* may include a longitudinal axis that is substantially parallel to a longitudinal travel direction of an endless belt 105 of the conveyor. Further, each first upper carriage beam 135*a* may be positioned at approximately the same elevation and may be positioned to generally reside underneath an upper support beam 160 of the support frame. The longitudinal axis of each first upper carriage beam 135*a* may be approximately parallel to a longitudinal axis of the upper support beam 160 that is positioned above it. Yet further, the first upper carriage beams 135*a* may be spaced apart from each other at a distance, as measured from inner facing edges of the first upper carriage beams 135*a*, that is at least as great as a width of the conveyor belt 105.

The second upper carriage beam 135*b* may be joined to the first upper carriage beams 135*a* proximate the rear end portions of the first upper carriage beams 135*a*. The second upper carriage beam 135*b* may span between the first upper carriage beams 135*a*. A longitudinal axis of the second upper carriage beam 135*b* may be generally transverse to the longitudinal axes of the first upper carriage beams 135*a*. The second upper carriage beam 135*b* may help to maintain the first upper carriage beams 135*a* at their spaced apart distance.

The third upper carriage beam 135*c* may be joined to carriage columns 145*a* positioned at the front portion of the carriage 115. Similar to the second upper carriage beam 135*b*, the third upper carriage beam 135*c* may generally span the distance between the first upper carriage beams 135*a* and may have a longitudinal axis that is generally transverse to the longitudinal axes of the first upper carriage beams 135*a*. The third upper carriage beam 135*c* may also help to maintain the first upper carriage beams 135*a* at their spaced apart distance.

Each first lower carriage beam 140*a* may be positioned to reside directly underneath, at a predetermined distance, one of the first upper carriage beams 135*a*. Each first lower carriage beam 140*a* may include a longitudinal axis that is substantially parallel to a longitudinal travel direction of the endless belt 105 of the conveyor. Further, each first lower carriage beam 140*a* may be positioned at approximately the same elevation.

Each second lower carriage beam 140*b* may be joined to the first lower carriage beams 140*a* and may span between them. One of the second lower carriage beams 140*b* may be joined to front end portions of the first lower carriage beams 140*a*, and the other of the second lower carriage beams 140*b* may be joined to the rear end portions of the first lower carriage beams 140*a*. The second lower carriage beam 140*b* may assist in maintaining the spaced apart distance of the first lower carriage beams 140*a*.

The first set of carriage columns 145*a* may join one of the first upper carriage beams 135*a* to the lower carriage beam 140*a* that is positioned underneath it, and the second set of carriage columns 145*b* may join the other of the first upper carriage beams 135*a* to the lower carriage beam 140*a* that is positioned underneath it. Each set of carriage columns 145*a-b* may include three carriage columns: one carriage column that spans between its respective first upper and lower carriage beams 135*a*, 140*a* at the front end portions of the carriage beams 135*a*, 140*a*; one carriage column that spans between its respective first upper and lower carriage beams 135*a*, 140*a* at the middle portions of the carriage beams 135*a*, 140*a*; and one carriage column that spans between its respective first upper and lower carriage beams 135*a*, 140*a* at the rear end portions of the carriage beams 135*a*, 140*a*. The carriage columns may help to maintain the spacing between the first upper carriage beams 135*a* and the lower carriage beams 140*a*.

The various upper and lower carriage beams 135*a-c*, 140*a-b* and carriage columns 145*a-b* may collectively define a generally three-dimensional box-like carriage frame 170 for the carriage 115. The carriage frame 170 may be used to rotatably support a take-up pulley 165 and at least a portion of the endless belt 105 that is joined to the take-up pulley 165. Further, the take-up pulley 165 may be joined to the carriage frame 170 so that any sliding movement of the carriage frame 170 relative to the support frame 130 results in the take-up pulley 165 moving by the same magnitude and in the same direction as the carriage frame 170. Further, the sliding movement of the carriage frame 170 relative to the support frame 130 allows for a desired tension to be maintained in the endless belt 105.

A first pulley bearing 175 may be joined to one of the carriage columns in the first set of carriage columns 145*a*, and a second pulley bearing 175 may be joined to one of the carriage columns in the second of carriage columns 145*b*. The first and second pulley bearings 175 may rotatably support the take-up pulley 165, which in turn supports the endless belt 105. Thus, the carriage 115 may rotatably support the take-up pulley 165 for the conveyor.

The first set of carriage posts 150*a* may join one of the first upper carriage beams 135*a* to the upper support beam 160 that is positioned above it, and the second set of carriage posts 150*b* may join the other of the first upper carriage beams 135*a* to the upper support beam 160 that is positioned above it. Each set of carriage posts 150*a-b* may include two carriage posts: one carriage post that spans between its respective first upper carriage beam 135*a* and upper support beam 160 at the front end portion of the first upper carriage beam 135*a*; and one carriage post that spans between its respective first upper carriage beam 135*a* and upper support beam 160 at the rear end portion of the first upper carriage beam 135*a*. Each carriage post 150*a-b* may further include a wheel, a roller, or the like 180 joined to the carriage post by an axle or the like. Each wheel, the roller, or the like 180 may be received within a track attached to a respective upper support beam 160. The wheels, the rollers, or the like 180 allow the carriage 115 to slide or otherwise move relative to the upper support beams 160 in a direction that is substantially parallel to a longitudinal direction of travel of the endless conveyor belt 105.

A pair of connector adjustment mechanisms 155 may be joined to the adjustment mechanism beam 185. Each connector adjustment mechanism 155 may be spaced apart from the other connector adjustment mechanism 155 by a predetermined distance. Further, in some embodiments, each connector adjustment mechanism 155 may be positioned proximate an end portion of the adjustment mechanism beam 185. Each connector adjustment mechanism 155 may take to the form of a turnbuckle or other structure that allows for an alignment or adjustment of the respective connector 120 joined to the connector adjustment mechanism 155. In some embodiments, each connector adjustment mechanism 155 may be used as a way to finely adjust the length of the connectors 120 in order to align the take-up pulley 165 to provide for correct tracking of the endless belt 105. U-shaped connection elements 190 or the like may be joined to the adjustment mechanism beam 185 to facilitate joining the turnbuckles or the like to the connector adjustment mechanism beam 185.

The adjustment mechanism beam 185 may be joined to the carriage columns 145*a-b* that are positioned at the rear end portions of the lower carriage beams 140*a* and may span between the columns 145*a-b*. Further, the adjustment mechanism beam 185 may be located at an elevation that is approximately the same as the elevation of an axle 195 that supports the take-up pulley 165.

The counterweight assembly 110 may include two counterweight arms 200, two tension arms 205, one or more counterweights 210, and a counterweight support system 215. If desired, more or less than two counterweight arms 200 and two tension arms 205 may be utilized. Each tension arm 205 may be joined to an end portion of a counterweight arm 200 and may extend generally transversely away from a longitudinal axis of the counterweight arm 200. Gusset plates or other stiffeners 220 may be joined to each tension arm 205 and its respective counterweight arm 200.

Each counterweight arm 200 may be pivotally joined to a lower support beam 225 of the support frame 130 via one or more pivot plates 230 or the like. Each counterweight arm 200 may be joined to its respective pivot plate 230 via a pivot axle or the like that extends through aligned holes formed in the counterweight arm 200 and its respective pivot plates 230. Further, each counterweight arm 200 may be joined to its respective pivot plates 230 proximate to the end portion of the counterweight arm 200 from which the tension arm 205 ends. The counterweight arms 200 may be spaced apart from each other at approximately the same distance as the connector adjustment mechanisms 155 are spaced apart from each other. To help maintain this spacing, a counterweight arm beam 235 may be joined at each end to one of the counterweight arms 200 proximate the end portions of the counterweight arms 200 that are proximate their respective pivot plates 230. The counterweight arm beam 235 may generally span between the counterweight arms 200 and may generally have a longitudinal axis that is generally transverse to the longitudinal axes of the counterweight arms 200.

The counterweight support system 215 may be joined to the counterweight arms 200 at end portions of the counterweight arms 200 that are distal from the end portions of the counterweight arms 200 that are joined the pivot plates 230. The counterweight support system 215 may include one or more upper counterweight beams 240 and one or more lower counterweight beams 245 that are joined to upper portions and lower portions, respectively, of the counterweight arms 200. The upper and lower counterweight beams 240, 245 may generally span between the counterweight arms 200 and may be configured to define counterweight spaces, with each counterweight space sized to receive at least portions of one of the counterweights 210 therein. Further, the upper and lower counterweight beams 240, 245 may be configured to maintain the counterweights 210 received within the counterweight spaces as the counterweight arms 200 pivot from an upper limit position shown in FIG. 2 to a lower limit position shown in FIG. 3.

To facilitate pivotal movement of the counterweight arms 200 to a position below horizontal, such as the lower position shown in FIG. 3, lower portions of the counterweight arms 200 and upper portions of the lower support beam 225 may be removed proximate the pivot plates 230. In some embodiments, the desired pivot range for the counterweight arms 200 may range from approximately 30 degrees above horizontal to approximately 15 degrees below horizontal, although other ranges are contemplated, including, but not limited to, 45 degrees above horizontal to approximately 45 degrees below horizontal. Keeping the range of rotation from approximately 30 degrees above horizontal to approximately 15 degrees below horizontal may facilitate keeping the lengths of the connectors 120 approximately aligned parallel to the longitudinal direction of travel of the endless belt 105. Further, such a range may keep the tension applied to the carriage 115 via the connectors 120 substantially constant. In particular, the tension may vary less than 4% from a median value. In some embodiments, the distance that the counterweight arms 20 are allowed to rotate below horizontal may be set to minimize the amount of interference with a maintenance area located below the counterweight assembly 110.

Two connectors 120 may be used to join the carriage 115 to the counterweight assembly 110. Each connector 120 may be joined at one end to one of the connector adjustment mechanisms 155 and at a distal end to one of the tension arms 205. Further, each connector 120 may be joined to its respective tension arm 205 at an end portion of the tension arm 205 that is distal from the counterweight arm 200. In such embodiments, the length of the tension arms 205 and the length of the counterweight arms 200 may be used to control the mechanical advantage of the counterweights 210 relative to the tension in the conveyor belt 105. In some embodiments, the lengths of the tension arms 205 and the counterweight arms 200 are selected to give the counterweights 210 a mechanical advantage of 5:1. In other embodiments, the lengths of the tension arms 205 and the counterweight arms 200 may be selected to give the counterweights 210 a mechanical advantage from as low as approximately 1:1 to as high as approximately 10:1. In yet other embodiments, the mechanical advantage may be any desired ratio depending upon the requirements for the specific case.

Each connector 120 may take the form of a tension chain, a tension cable or the like. In some embodiments, the connector 120 may be adjustable in length so that the distance between the connector adjustment mechanism 155 and a respective tension arm 205 may be selectively increased or decreased. In some embodiments, the length of the tension chain to the length of the tension arm 205, where the length of the tension arm 205 is measured from the pivot point 230 of the counterweight arm 200 to the point that the tension chain is attached to the tension arm, may be approximately 3:1. Such a ratio may help to keep the length of the connector 120 substantially parallel to the direction of longitudinal travel of the endless belt 105. Additionally, the length of each connector 120 may be generally parallel to the longitudinal axis of the counterweight arm 200 to which it is joined via the tension arm 205 that is joined to the counterweight arm 200. Yet further, the length of each connector 120 may be generally parallel to a longitudinal axis of the connector adjustment mechanism 155.

Each safety restraint 125 may take the form of a safety chains, cables, or the like. One end of each safety chain or cable may be joined to the end portion of a counterweight arm 200 that is proximate the counterweights 210 and a distal end may be joined to a safety restraint connection element 255 that may be joined to the conveyor frame or other support. A length of each safety chain or cable may be selected to resist pivotal movement of the counterweight arm 200 to which it is attached beyond a desired angle below horizontal. For example, the length of each safety chain or cable may be selected to keep the counterweight arm to which it is attached from pivoting beyond 15 degrees below horizontal. Further, when the counterweight arm 200 to which the safety chain or cable is attached reaches its lower limit position, e.g., when it reaches 15 degrees below horizontal, the safety chain or cable may have little to no slack along its length, thus providing a visual indication that the counterweight arm 200 is positioned at its lower limit position.

The support frame 130 may include the two or more upper support beams 160, the lower support beam 225, two or more support columns 260, and two or more support posts 265. The two or more upper support beams 160 may be joined to the two or more support columns 260 and the two or more support posts 265. Similarly, the lower support beam 225 may be joined to the two or more support columns 260. The support columns 260 and the support posts 265 may be joined to the conveyor frame (not shown), which may be used to support the support frame 130 and the various components of the take-up device 100 (e.g., the carriage, the counterweight assembly, the counterweights) that are supported by the support frame 130.

The beams, columns, arms, and other structural members for the carriage 115, the counterweight assembly 110, the connectors 120, the support frame 130, and the safety restraints 125 may be formed from a metal, such as steel, or any other suitable material. Further, these members may be any suitable shape, including, but not limited to, W-shapes, H-shapes, angles, boxes, tubes, or cylinders, or may take the form of chains, cables, rods, and so on. Further, the members may be joined by any suitable connection method, including by welds, bolts, or rivets. Yet further, elements such as plates, gussets, or stiffeners may be joined to the structural members to strengthen the members and/or to facilitate joining the members together.

In operation, the take-up pulley 165 may be mounted onto the carriage 115, which may be configured to slide or otherwise move relative to the support frame 130 in a direction that moves the take-up pulley 165 in a direction that is substantially parallel to the longitudinal direction of travel of the endless belt 105. One or more tension arms 205 apply tension to the endless belt 105 via one or more connectors 120 joined to the carriage 115. In particular, each tension arm 205 applies a force on the carriage 115 that pulls the carriage 115 in a direction towards the counterweights 210. As the carriage 115 is moved in this direction, a tail end of the endless belt 105, which is joined to the carriage 115 via the take-up pulley 165, is also moved in this direction. The opposite, or head end, of the endless belt 105 resists this movement, thus resulting in tension being applied to the endless belt 105 as it is stretched between its head and tail ends.

The force applied by each tension arm 205 to the carriage 115 is created by a moment applied to each tension arm 205 by the counterweights 210 being pulled in a downward direction by gravity. This moment causes the counterweight arms 200 and the tension arms 205 to rotate about a pivot axis defined by the pivot axles that join the counterweight arms 200 to their respective pivot plates 230. The direction of rotation arising from the moment created by the counterweights 210 effectively causes the tension arms 205 to try to move away from the carriage 115. This, in turn, results in the tension arms 205 applying a force to the carriage 115 via their respective connectors 120. As described above, each tension arm 205 may be shorter than its respective counterweight arm 200 in order to provide the counterweights 210 with a mechanical advantage. Further, the amount of tension provided by each tension arm 205 may be readily adjusted by increasing or decreasing the mass of the counterweights 210.

The counterweight arms 200 may be configured to operate within a desired rotational range, such as from an upper limit position of approximately 30 degrees above horizontal to a lower limit position of 15 degrees below horizontal. When the counterweight arms 200 need to be reset as a result of reaching the lower limit position, the length of each connector 120 joined to its respective counterweight arm 200 may be adjusted to allow each counterweight arm 200 to be moved from its lower limit position to its upper limit position without impacting the current relative location of the carriage 115 to the support frame 130. Limit switches may be operatively associated with the counterweight arms 200 to notify an operator when the counterweight arms 200 require resetting. For example, a first limit switch may activate a warning signal in a control room for the conveyor, and a second limit switch may cut power to the conveyor to avoid conveyor operational problems due to low take-up tension.

The safety restraints 125 may keep the counterweight arms 200 from swinging below their lower position limit. Further, the absence of slack in the safety restraints 125 may provide a visual indication to the conveyor operators that the take-up device 100 requires shortening of the connectors 120 in order to accommodate any elongation that has developed in the endless conveyor belt 105.

To shorten the connectors 120, the conveyor operators may temporarily connect the carriage 115 to a substantially stationary structure, such as the support frame 130, via cables, chains or other connection elements in such a manner so as to prevent movement of the carriage 115 away from the counterweights 210. A hoist or other suitable device may then be used to move each counterweight arm 200 from its lower position to its upper position. Each connector 120 may then be released and re-attached with its respective tension arm 205. During this release and re-attachment step, the length of each connector 120 may be shortened, thus shortening the distance between the carriage 115 and the tension arm 205. Each connector 120 may be re-attached to its respective tension arm 205 with a suitable fastening mechanism, such as hooks, chain slots, bolts and plates, open links, and so on. Additionally, each connector adjustment mechanism 155 may be used to finely adjust the length of the connectors 120 in order to align the take-up pulley 165 to provide for correct tracking of the endless belt 105.

When initially pre-tensioning the endless belt 105 to a desired static tension, a single stroke of the counterweight arms 200 (i.e., movement of the counterweight arms 200 from the upper limit position to the lower limit position) may not provide enough travel to pre-tension the endless belts 105 to the desired static tension. If this occurs, the desired pre-tension may be achieved by holding the carriage 115 in the position achieved by the maximum stroke of the counterweight arms 200, re-setting the tension arm 205 and connectors 120 in a manner as described above, and repeating the movement and re-setting of the counterweight arms 200 as many times as needed to obtain the desired pre-tension.

In some embodiments, one or more dampers, such as a linear or torsional dampers, may be joined to at least one of the counterweight arms 200. The dampers may be used to dampen any tendency of the counterweight arms 200 to bounce against the elasticity of the endless belt 105.

The take-up devices 100 described herein may be used on short or long conveyors. For longer conveyors, the take-up devices 100 may generally work better on longer conveyors where the amount of dynamic take-up travel during operation is minimal for the sweep of the tension arms.

In some designs of long conveyors, both the initial permanent extension of the belt as well as the dynamic belt elongation may require far more take-up travel than is easily accommodated within the configuration described above. For example, in a steel-cord overland conveyor of about five miles in length between head and tail pulleys, the initial permanent extension may be of the order of forty feet, and the dynamic range of elongation may be of the order of about fifteen feet. For such conveyor systems, the take-ups described below may provide an attractive solution.

Figure 9:
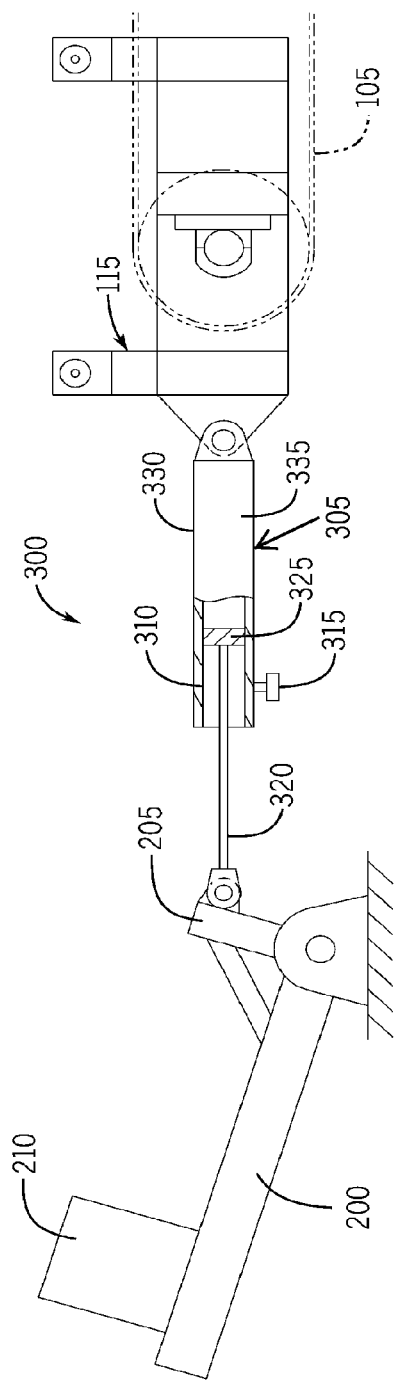
FIG. 9 shows a schematic elevation view of another embodiment a take-up device, where the linking element connecting the carriage to the tension arm of the counterweight is a hydraulic cylinder assembly.

FIG. 9 shows a second embodiment of a take-up device 300, where the linking element connecting the carriage 115 to the tension arm 205 of the counterweight 210 is a hydraulic cylinder assembly 305. The hydraulic cylinder assembly 305 may include a hydraulic cylinder 330 and a piston. The piston may include a piston head 325 joined to a piston rod 320. The hydraulic cylinder 330 may be partially filled with fluid 310 and incorporate a valved port 315 for intermittent connection to an external hydraulic pump.

In this arrangement, a piston rod 320 connected to a hydraulic piston head 325 provides tension to the tension arm 205. Fluid 310 trapped in compression within a section of the hydraulic cylinder 330 supports the piston head 325, thus preventing any significant relative movement between the piston head 325 and the hydraulic cylinder 330. During normal operation of the conveyor, this hydraulic cylinder assembly 305 therefore serves as a fixed-length link between the counterweight 210 and the take-up carriage 115. However, the use of the hydraulic fluid 310 in the hydraulic cylinder assembly 305 allows for easy adjustment of the counterweight position to compensate for permanent stretch of the conveyor belt 105.

For example, if the conveyor belt 105 has undergone sufficient permanent stretch that the counterweight arm 200 has fallen to its "low" position, the counterweight arm 200 may be re-set to its high position by the following steps. First, a hydraulic pump, such as a portable hydraulic hand-pump, may be connected to the valved port 315 on the hydraulic cylinder 330. Feeding the hydraulic pump from a separate source of hydraulic fluid, an operator may inject pressurized hydraulic fluid to increase the volume of the hydraulic fluid 310 already trapped within the cylinder 330. As more fluid is thus forced into the cylinder 330, the piston head 325 will move towards the blind end 335 of the hydraulic cylinder 330. Since the take-up pulley carriage is restrained from moving by the tension in the belt 105, the movement of the piston hood 325 is accommodated by the counterweight arm 200 rotating back up to a higher position. When the counterweight arm 200 has reached the desired position, the valved port 315 may be closed and the hydraulic pump connection removed.

Through this sequence, the position of the counterweight 210 may be re-set periodically as needed. This embodiment does not require the take-up carriage 115 to be clamped in place, or a separate lifting device to raise the counterweight 210, or provision of a fine mechanical adjustment such as a turnbuckle in the line of tension-carrying members.

Figure 10:
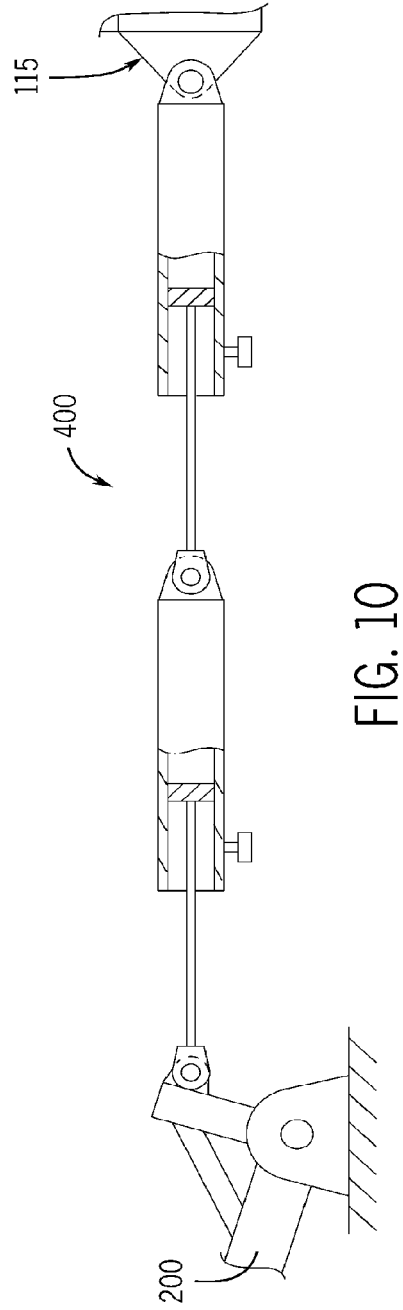
FIG. 10 shows a schematic elevation view of a third embodiment of a take-up device of FIG. 9, where at least two hydraulic cylinder assemblies are structurally joined in series.

FIG. 10 shows a third embodiment of the take-up device 400. The third embodiment is generally similar to the second embodiment. However, in the third embodiment, at least two hydraulic cylinder assemblies are structurally joined in series in order to provide a longer active stroke, without a requirement for very long individual cylinders. Some conveyor systems may require a greater length of permanent-elongation adjustment than can be economically obtained from a single hydraulic cylinder. In such cases, two or more hydraulic cylinder assemblies may be connected in series, such as in FIG. 10, where cylinder assemblies 405, 410 are connected in series. In such a configuration, the extended adjustment available is obtained from the two hydraulic-fluid chambers 415, 420, each of which may be independently charged with more hydraulic fluid in order to shorten the distance between the take-up carriage 115 and the counterweight arm 200.

In the arrangements described above, as with the arrangements to be described below, the small amount of hydraulic fluid that may leak past the seals over time may be easily replaced by occasionally charging the cylinders from a hydraulic pump carried in for the purpose.

Figure 11:
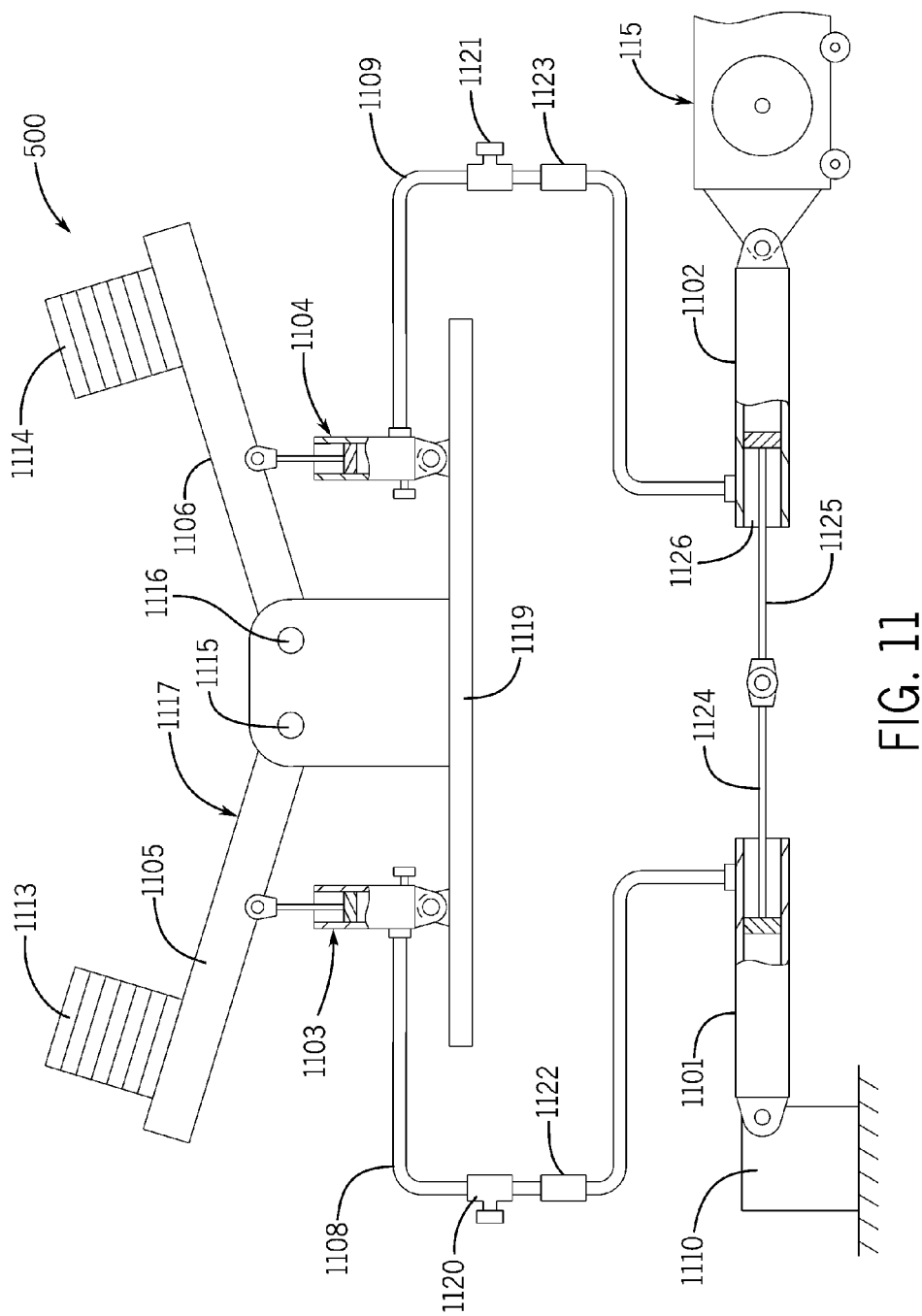
FIG. 11 shows a schematic elevation view of a fourth embodiment of a take-up device.

FIG. 11 shows a fourth embodiment of a take-up assembly 500. This take-up assembly 500 may also be suitable for conveyors requiring longer take-up travel for initial permanent stretch of the belt, or for dynamic elongation of the belt during operation, or for both permanent stretch and dynamic elongation. In this embodiment, the tensioning hydraulic cylinders 1101, 1102 are connected via fluid connectors 1108, 1109, which may be hydraulic pipes or hoses, to hydraulic rams 1103, 1104. Each hydraulic ram 1103, 1104 is pressurized by virtue of the loading imposed by the counterweight arms 1105, 1106. The attachment position of the hydraulic rams to the counterweight arms 1105, 1106 may be predetermined to provide a desired degree of mechanical advantage relative to the counterweights 1113, 1114, and to their pivot-points 1115, 1116.

With this arrangement, the counterweight sub-assembly 1117 may be located away from the axis of the belt and take-up carriage, perhaps at a place a short distance away that may be more convenient with respect to available space, or which may be clear of debris falling from the conveyor belt.

The hydraulic pressure provided by each hydraulic ram 1103, 1104 is transferred via the fluid connectors 1108, 1109 and acts within the fluid of the tensioning hydraulic cylinders 1101, 1102. This allows for transfer of tension from the conveyor belt through the take-up carriage, through the tensioning hydraulic cylinders 1101, 1102, and into a reaction frame 1110.

When the conveyor belt elongates due to permanent stretch, a tension cylinder 1102 may move towards the left of the FIG. 11, along with the take-up carriage 115. If the piston-rod 1125 remains in the same position relative to the reaction frame 1110, then the volume of fluid held inside the cylinder 1102 will increase as the pressurized volume 1126 increases by virtue of the relative movement. This pressurized fluid is supplied by fluid flowing from the hydraulic ram 1104, urged by the force provided by the counterweight arm 1106. To the extent that fluid is forced out of the hydraulic ram 1104, the counterweight arm 1106 will pivot to a lower position.

On the other hand, when dynamic tension in the conveyor belt increases and the take-up carriage is pulled to the right, fluid in the pressurized volume 1126 may be forced out in order to accommodate the required take-up pulley displacement. This fluid flows back into the hydraulic ram 1104, and the ram lifts the counterweight arm 1106. A similar process may simultaneously occur in the elements connected by the other hydraulic line 1108.

The hydraulic rams 1103, 1104 and the hydraulic tensioning cylinders 1101, 1102 may be proportioned relative to each other and take into account the necessary force balances, so that sufficient stroke is available in both the rams and the cylinders, and so that the required tensioning force is available to the take-up carriage 115.

The fluid connectors 1108, 1109 may include charging ports 1120, 1121 through which an operator may periodically inject pressurized hydraulic fluid. The volume of fluid contained in the hydraulic tensioning cylinders 1101, 1102 is dependent on the tension exerted by take-up carriage. Therefore fluid injected into the charging ports will flow preferentially into the hydraulic rams 1103, 1104 and lift the pistons in those cylinders, in turn raising the respective counterweight arms 1105, 1106. This preferential filling of the rams occurs because the pistons in the rams can rest in a range of positions, while exerting essentially the same pressure.

In some conveyor systems, under certain conditions it may be desirable to fix the take-up at a particular position, so that the take-up carriage 115 does not move relative to the anchoring frame 1110. In the configuration of FIG. 11, this fixation may be achieved by means of control valves 1122, 1123 installed in the hydraulic lines 1108, 1109. When the control valves 1122, 1123 are set to block flow through the fluid lines, the fluid volume in the hydraulic tension cylinders 1101, 1102 will remain constant, and so the piston-rods 1124, 1125 are unable to move relative to the cylinder walls. Therefore, the take-up carriage 115 will also not move, even as the tension in the belt changes. (It is assumed that in most cases the hydraulic fluid is—for practical purposes—incompressible.) The control valves 1122, 1123 may be automatically actuated in response to a signal from the conveyor system controls.

FIG. 11 shows two counterweight arms 1105, 1106 arranged opposite each other. This is a convenient configuration that provides for relatively small counterweights 1113, 1114, relatively low overall height, and relatively short hydraulic rams 1103, 1104. The opposed arrangement also avoids a large overturning moment on the support frame 1119, thus reducing the cost of foundations. However, although two mirrored assemblies are shown in FIG. 11, in some arrangements a designer may choose to have only one counterweight arm, one hydraulic ram and one connected hydraulic tensioning cylinder.

Figure 12:
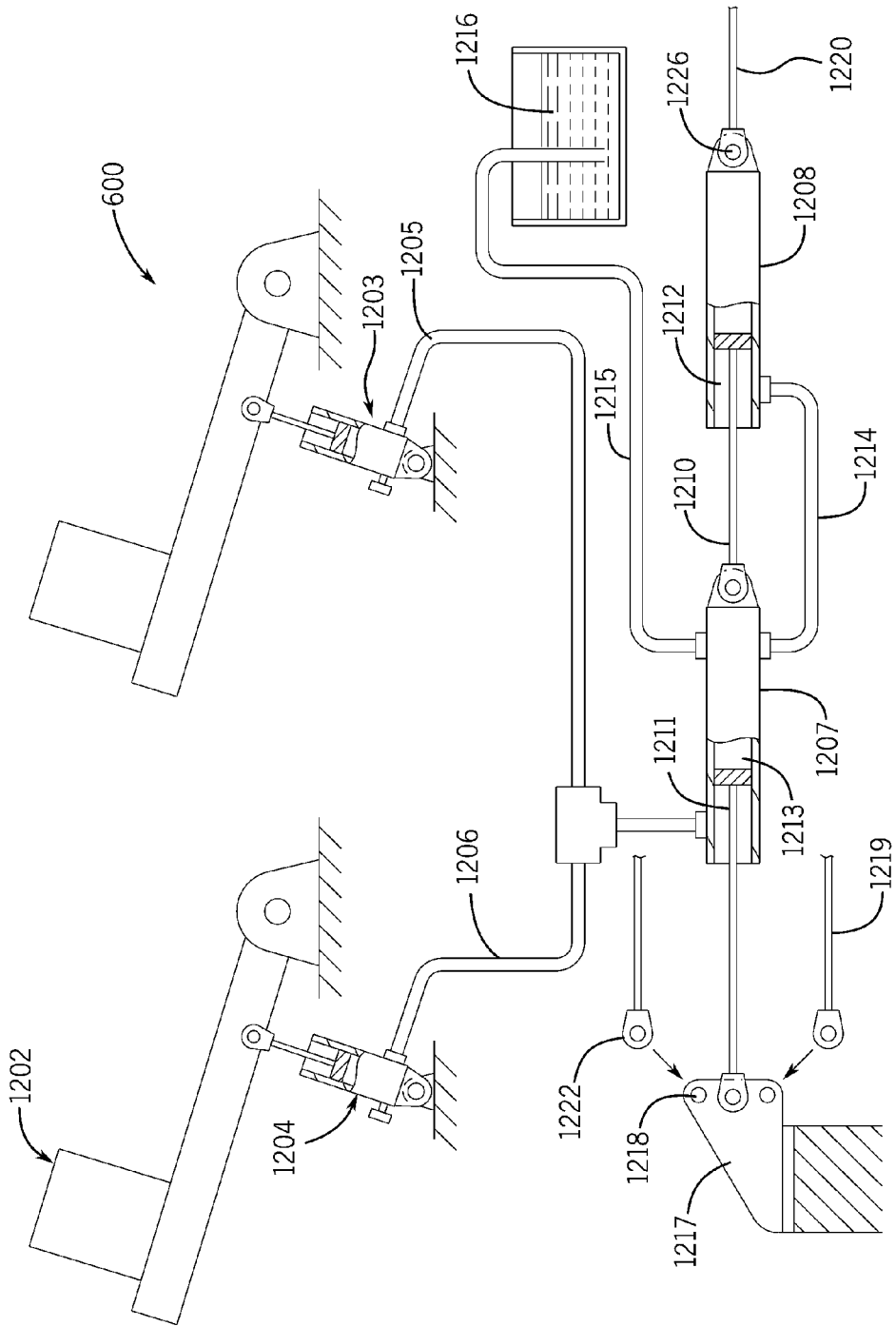
FIGS. 12 and 13 show schematic elevation views of a fifth embodiment of a take-up device.
Figure 13:
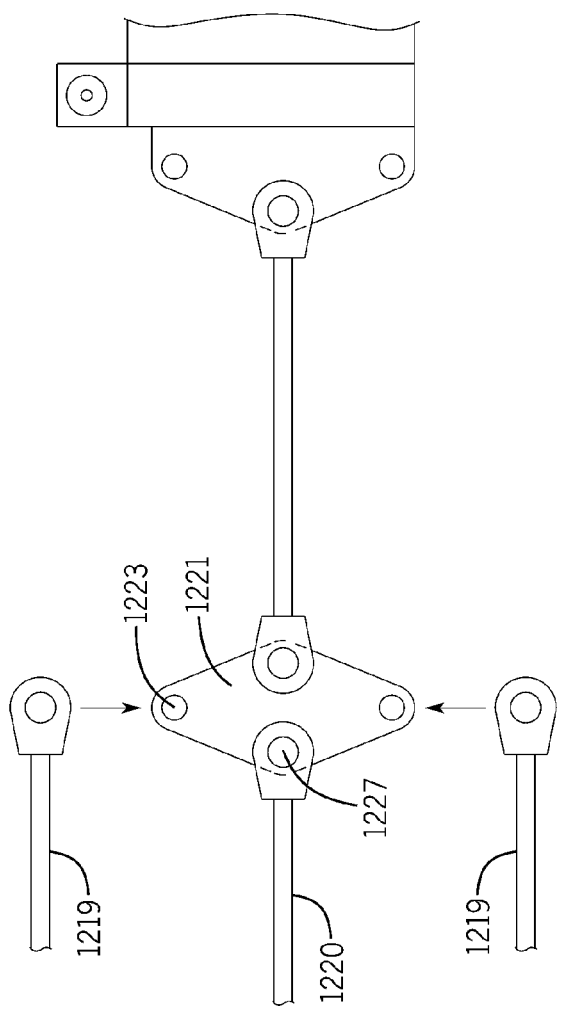

FIGS. 12 and 13 show a fifth embodiment of a take-up system 600. This take-up system 600 may also be suitable for conveyors requiring long take-up travel for initial permanent stretch of the belt, or for dynamic elongation of the belt during operation, or for both permanent stretch and dynamic elongation. This arrangement includes removable spacer links that may be used to adjust for initial permanent stretch of the conveyor belt. In this arrangement, a different configuration of hydraulic tension cylinders connected in series is illustrated.

The arrangement and use of the removable spacer links of FIGS. 12 and 13 will now be described. The purpose of the removable links is to allow for a large range of initial elongation of the conveyor belt, without the need to provide for very long hydraulic tension cylinders. By the illustrated arrangement, the tension links are used during the commissioning and run-in of the conveyor, and once they have been removed, the required dynamic change in take-up position may be accommodated by hydraulic tension cylinders. In FIG. 12, the tension exerted on the take-up pulley by the conveyor belt is transferred into a series of removable links 1220, which in turn carry the tension through hydraulic-cylinder assemblies 1207, 1208 to an support such as an anchoring plate 1217. The removable links 1220 may be in the form of wire rope with pin-end terminations, or else some other suitable tension connector. The links 1220 may be connected to each other through connecting plates 1221.

When, during initial installation or run-in of the conveyor, the hydraulic tension cylinders 1207, 1208 have nearly pulled in the take-up carriage as far as their strokes will allow, a tension link 1220 may be removed by the following procedure. First, anchor ropes 1219 may be pinned via rope-ends 1222 to anchor holes 1218 in the anchor plate 1217. The anchor-holes 1218 may be slotted in order to facilitate mounting of the anchor ropes 1219. Then an operator may pump hydraulic fluid in or out of the tensioning cylinders 1207, 1208 so that the free ends of the anchor ropes align with attachment holes 1223 in a connecting plate 1221. After using pins or the equivalent to connect the free rope-ends 1222 to the connecting plate holes 1223, the operator may relieve the fluid pressure in the hydraulic tensioning cylinders, once control valves have been appropriately set. These actions will result in the tension path running through the anchor ropes 1219, leaving no load on the link/s 1220 bracketed by the anchor ropes.

The unloaded link/s 1220 may now be removed, and pressurization of the blind ends of the tension cylinders 1207, 1208 will allow the operator to position the free end of the tension series, which may be at cylinder pin 1226, in line with the free hole 1227 in the connecting plate 1221. Once the usual tension path through the tensioning cylinders has thus been re-established, an operator may manipulate the fluid volumes in the hydraulic tensioning cylinders 1207, 1208 so that the anchor ropes 1219 are relieved of their tension and may be removed and put aside until it is time for another temporary link to be removed.

Turning now to the arrangement of the series hydraulic tensioning cylinders 1207, 1208 of FIG. 12, which are configured to allow a substantial length of dynamic take-up carriage travel without the need for very long tensioning cylinders or very long strokes of the hydraulic rams used to pressurize the cylinders.

As illustrated in the configuration of FIG. 12, the larger volume of displaced fluid required for longer tensioning cylinder travel may be provided by adding a second pressurizing assembly comprising a counterweight assembly 1202 and an hydraulic ram assembly 1204. These assemblies may be added to a take-up system if convenient. The hydraulic rams 1203, 1204 may feed a first hydraulic tensioning cylinder via hydraulic lines 1205, 1206.

Hydraulic tensioning cylinder 1207 may be structurally connected in series with hydraulic tensioning cylinder 1208, such as via the piston-rod 1210. Furthermore, a hydraulic line 1214 may be provided between the first cylinder 1207 and the second cylinder 1208, and configured to connect in to the respective cylinders with suitable valving so that pressurized hydraulic fluid to the left of piston 1211 may flow from the first cylinder into the working volume 1212 of the second cylinder, but only when the piston 1211 has reached the limit of its stroke within the first cylinder 1207. The flow of pressurized hydraulic fluid, still urged by the remaining stroke in the hydraulic rams 1203, 1204, may serve to displace the piston rod 1210 further into the cylinder 1208, thus providing the desired additional take-up travel. In order to ensure that no air is entrained by the hydraulic fluid as the piston 1211 actuates the flow into hydraulic line 1214, the cylinder volume 1213 may be constantly filled with hydraulic fluid. As the piston 1211 advances into the cylinder 1207, the fluid that is displaced may be bled via a line 1215 into a hydraulic-fluid reservoir 1216. Such sequential pressurization arrangements may be well-known among those skilled in the art of telescoping hydraulic cylinders.

Figure 14:
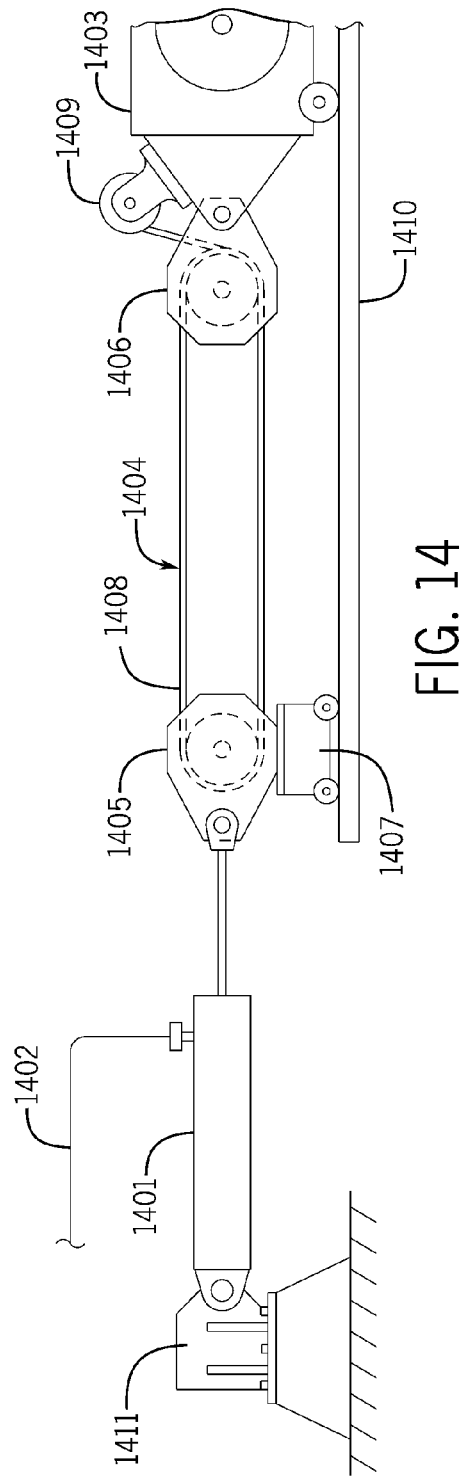
FIG. 14 illustrates a schematic elevation view of an alternative arrangement for dealing with the long take-up travel required in some conveyor systems to compensate for initial permanent elongation.

FIG. 14 illustrates an alternative arrangement for dealing with the long take-up travel required in some conveyor systems to compensate for initial permanent elongation. Instead of removable links, this arrangement uses a winch in the tension series. In FIG. 14, a hydraulic line 1402 provides fluid pressurized by the type of counterweight-and-ram sub-assembly described earlier, but not shown in this illustration. The fluid loads a hydraulic tensioning cylinder 1401 that is anchored to a support, such as an anchoring plate 1411, as described in the previous embodiments. A winch system 1404 may connect the hydraulic tensioning cylinder 1401 to a take-up carriage 1403.

The winch system 1404 may include sheave blocks 1405, 1406, each including a number of wire-rope sheaves on a common axis. The weight of sheave block 1405 may be supported on a traveling cart 1407, which may run on the same guides 1410 that carry the take-up carriage 1403. The winch system 1404 may further include flexible member, such as a winch rope 1408, anchored at one end to winch block 1406 (anchored end not shown in the figure), then reaved to and fro between the two winch blocks, with its free end then terminating on the drum of a winch 1409 carried on the take-up carriage 1403. By arranging for multiple reaves between the two sets of rope sheaves in the sheave blocks 1405, 1406, a relatively light wire rope 1408 and low-tension winch 1409 may safely transfer very high tensions between the take-up carriage 1403 and the hydraulic-tensioning cylinder 1401.

In order to accommodate the initial elongation of the conveyor belt, an operator may from time to time activate the winch 1409 to wind more winch rope 1408 onto the winch drum. The winch may preferably be of the type that self-locks when not being powered. This action will shorten the distance between the sheave blocks 1405, 1406, and—by displacing the piston within the hydraulic tensioning cylinder 1401 towards the right—will drive fluid through the line 1402 and into the remote hydraulic ram, thus lifting the counterweight arm and re-setting the position of the counterweight subassembly.

All directional references (e.g., upper, lower, upward, downward, left, right, leftward, rightward, top, bottom, above, below, vertical, horizontal, clockwise, and counter-clockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the scope of the invention as defined in the appended claims.

What is claimed is:

1. A take-up device for a conveyor, comprising:
a carriage movably joined to a support structure;
a pulley joined to the carriage, the pulley configured for operative association with an endless belt of the conveyor;
a counterweight assembly comprising:
a counterweight arm pivotally joined to the support structure;
a tension arm that extends generally transversely from a first end portion of the counterweight arm; and
a counterweight supported by the counterweight arm at a second end portion of the counterweight arm where the second end portion of the counterweight arm is distal from the first end portion of the counterweight arm; and
an adjustable connector joined to the carriage and to the tension arm and configured to transfer forces between the carriage and the tension arm.

2. The take-up device of claim 1, further comprising a connector adjustment mechanism joined to the carriage, and the connector is joined to the carriage via the connector adjustment mechanism.

3. The take-up device of claim 2, wherein the connector adjustment mechanism comprises a turnbuckle.

4. The take-up device of claim 1, wherein the counterweight assembly further comprises:
a second counterweight arm pivotally joined to the support structure and configured to move from the upper limit position to the lower limit position;
a second tension arm that extends generally transversely from a first end portion of the second counterweight arm; and
the counterweight is also supported by the second counterweight arm at a second end portion of the second counterweight arm where the second end portion of the second counterweight arm is distal from the first end portion of the second counterweight arm.

5. The take-up device of claim 4, further comprising a second connector joined to the carriage at one end portion of the second connector and to the second tension arm at a second end portion of the second connector that is distal the first end portion of the second connector.

6. The take-up device of claim 1, wherein the connector comprises a tension chain or cable.

7. The take-up device of claim 1, wherein the carriage, the counterweight assembly, and the connector are configured to substantially move the pulley in a direction that is substantially parallel to a longitudinal direction of travel of the endless belt.

8. The take-up device for a conveyor of claim 1, wherein the adjustable connector is a hydraulic cylinder assembly joined to the carriage and to the tension arm and configured to transfer forces between the carriage and the tension arm.

9. The take-up device for a conveyor of claim 8, wherein the hydraulic cylinder assembly comprises a hydraulic cylinder joined to the carriage, and a hydraulic piston joined to the tension arm and movably joined to the hydraulic cylinder.

10. The take-up device for a conveyor of claim 8, wherein the hydraulic piston comprises a piston head joined to a piston rod.

11. The take-up device for a conveyor of claim 8, wherein the hydraulic cylinder assembly includes a first hydraulic cylinder assembly joined in series to a second hydraulic cylinder assembly, with the first hydraulic cylinder assembly joined directly to the carriage and the second hydraulic cylinder assembly joined directly to the tensioner arm.

12. A take-up device for a conveyor, comprising:
a carriage movably joined to a support structure;
a pulley joined to the carriage, the pulley configured for operative association with an endless belt of the conveyor;
a counterweight assembly comprising a counter weight and at least one counterweight arm joined to a hydraulic ram, wherein the counterweight is supported by the counterweight arm and the counterweight arm moves pivotally about an end distal to the counterweight;

a hydraulic cylinder assembly joined to the carriage and to a support, the hydraulic cylinder assembly in fluid communication with the hydraulic ram, and the hydraulic cylinder configured to transfer forces between the carriage and the counterweight assembly.

13. The take-up device for a conveyor of claim 12, wherein the hydraulic cylinder assembly comprises at least two hydraulic cylinders joined in series with at least one of said two hydraulic cylinders joined to the support, and at least one other of said two hydraulic cylinders joined to the carriage.

14. The take-up device for a conveyor of claim 12, wherein the counterweight assembly comprises two counterweight arms and two hydraulic rams, with each counterweight arm joined to as least one of said two hydraulic rams.

15. The take-up device for a conveyor of claim 14, wherein each of said two hydraulic rams is in fluid communication with one of said at least two hydraulic cylinders, and at least two of said hydraulic cylinders are in fluid communication with each other.

16. The take-up device of claim 15, further comprising a reservoir in fluid communication with at least one of said at least two hydraulic cylinders.

17. The take-up device of claim 14, wherein each of said two hydraulic rams is in fluid communication with a different one of said at least two hydraulic cylinders.

18. The take-up device of claim 12, further comprising at least one link positioned between the hydraulic cylinder assembly and the carriage, the at least one link joined to the hydraulic cylinder assembly and to the carriage.

19. The take-up device for a conveyor of claim 12, wherein the hydraulic ram is located along the length of the counterweight arm such that the force that acts on the hydraulic ram varies with the position of the counterweight.

20. The take-up device for a conveyor of claim 12, wherein the hydraulic ram is connected to the counterweight arm between the counterweight and the pivot.

21. The take-up device for a conveyor of claim 12, wherein force exerted by the hydraulic tensioning cylinder varies according to an angle of the counterweight arm above the horizontal.

22. The take-up device for a conveyor of claim 12, wherein the hydraulic ram is mounted at an angle such that a minimum reaction force arises when the counterweight arm is in its highest position, and a maximum reaction force arises when the arm is in its lowest position.

23. The take-up device for a conveyor of claim 12, further comprising at least one additional hydraulic ram positioned with a different predetermined mechanical advantage with the counterweights.

24. The take-up device for a conveyor of claim 12, wherein the hydraulic ram has a diameter that is greater than a diameter of hydraulic cylinder.

25. A take-up device for a conveyor, comprising:
a carriage movably joined to a support structure;
a pulley joined to the carriage, the pulley configured for operative association with an endless belt of the conveyor;
a winch system joined to the carriage;
a cart joined to the winch system via a flexible member; and
a hydraulic cylinder assembly joined to the support structure and the cart, wherein the hydraulic cylinder assembly includes a hydraulic line that is pressurized by a counterweight sub-assembly.

26. The take-up device for a conveyor of claim 25, wherein the flexible member comprises a rope.

* * * * *